2,778,542

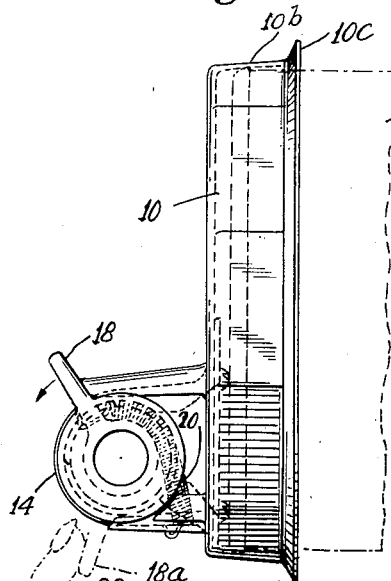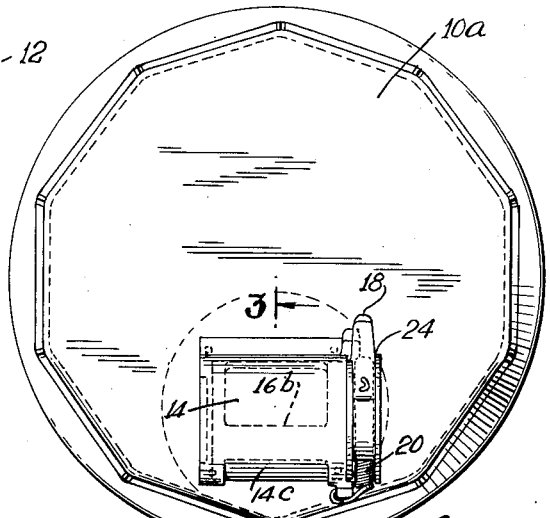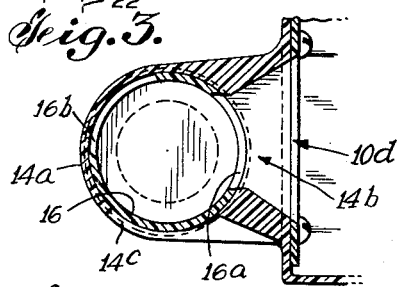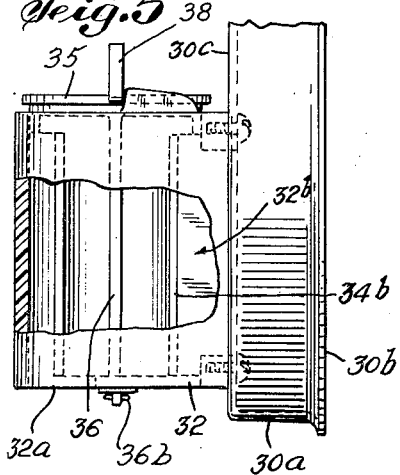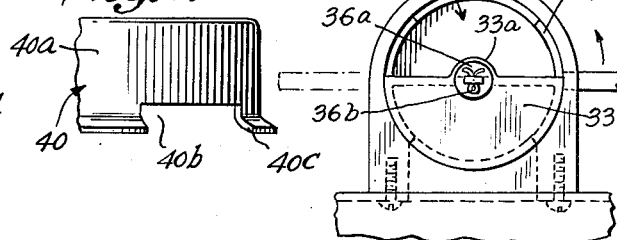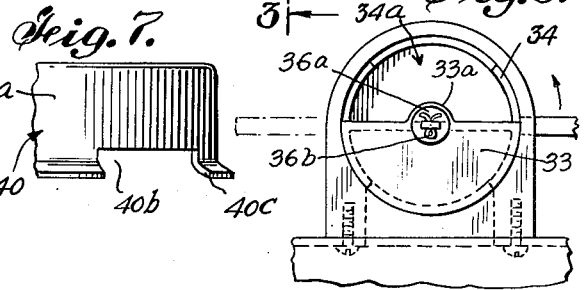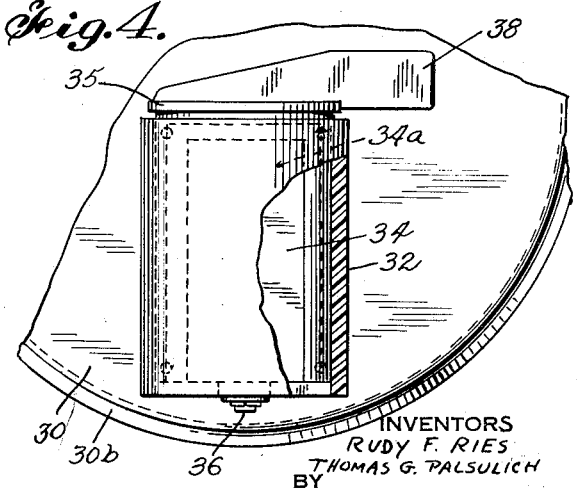
INVENTORS
RUDY F. RIES
THOMAS G. PALSULICH
BY
ATTORNEY United States Patent Office 2,778,542
Patented Jan. 22, 1957

MEASURING AND DISPENSING DEVICE FOR COFFEE, SUGAR, AND THE LIKE

Rudy F. Ries, Beechhurst, and Thomas G. Paisulich, Fresh Meadows, N. Y.

Application May 21, 1952, Serial No. 289,104

1 Claim. (Cl. 222—362)

This invention relates to a measuring and dispensing device for coffee, sugar and the like. This device embodies closure means for coffee cans, sugar jars and the like and the measuring and dispensing means are combined with said closure means to form a single, integral unit or assembly therewith.

Although this invention relates to the measuring and dispensing of granular and powdered foods and beverages generally, it is particularly applicable to ground coffee and it will be described in connection with ground coffee for purposes of illustration. Ground coffee is generally packed in cylindrical cans of one pound capacity. The tops of these cans may be removed to gain access to the coffee and these tops may then be re-applied to the cans to serve as closures or covers therefor.

It is a principal object of this invention to provide a substitute cover for these coffee cans, said cover embodying the measuring and dispensing means herein claimed.

Ground roasted coffee is packed and sold in vacuum or pressure packed cans in order to preserve the flavor and to prevent oxidation and rancidity. After the can is opened, it is the usual procedure to spoon out the contents in required quantities. Thus the coffee is exposed to the air each time the cover is removed and the advantage to the consumer of purchasing the coffee in vacuum or pressure sealed containers is thereby largely nullified.

The present device is intended to retain the advantage of vacuum or pressure packed cans and to keep the coffee fresh even after the cans are opened. This device includes a plastic cover which snugly engages the open top of the can and prevents air from entering. This cover remains on the can until its contents are completely dispensed, thereby avoiding frequent exposure to the air.

Incorporated in the cover is a measuring device which measures out a given or predetermined quantity of coffee, accurately and precisely. A preferred quantity would be a single teaspoon or a single tablespoon or any other conventional or popular quantity appropriate to coffee. An important advantage of a measuring device of this character is that the same appropriate quantity is measured out on each and every occasion that the coffee is dispensed. The consumer does not experience a stronger brew on some occasions and a weaker brew on others. There is also an avoidance of waste and a consequent saving to the consumer.

Another important feature of this invention is the dispensing means which automatically cooperates with the measuring means so that whatever quantity is measured out is automatically and conveniently dispensed. The measuring and dispensing means complement each other in function and manner of operation. When the measuring device is opened to the coffee in the can so that a measured quantity of coffee may enter said device, the dispensing device is closed. When it is desired to open the dispensing device so as to dispense said measured quantity of coffee, the measuring device automatically closes so as to prevent additional coffee from being dispensed through said dispensing device and also to prevent air from entering the can through said open dispensing device.

An important feature of this invention is the transparent character of the cover. It is possible by simply looking into the can through the transparent cover and without removing the cover from the can to ascertain the quantity of coffee remaining in the can. This is a very handy feature and it also helps keep the air out of the can.

Still another important feature of this invention is the adaptability of the cover to cans of various sizes, within reasonable limitations of course. The cover is made of relatively flexible or yieldable material so as to conform to cans of different sizes.

Still another feature of this invention is the fact that the entire assembly, that is, the cover and the measuring and dispensing means, are made of moisture resistant material. This is a useful feature on moist days and in moist or humid climates since it tends to keep the contents of the can dry.

Preferred forms of this invention are shown in the accompanying drawing in which:

Fig. 1 is a side view of a coffee measuring and dispensing device made in accordance with one form of this invention.

Fig. 2 is a top view thereof.

Fig. 3 is a sectional view through the measuring and dispensing means on the line 3—3 of Fig. 2.

Fig. 4 is a fragmentary top view, partly in section, of a measuring and dispensing device made in accordance with a second form of this invention.

Fig. 5 is a fragmentary side view thereof, partly in section.

Fig. 6 is a fragmentary front view of said device.

Fig. 7 is a fragmentary perspective view of a cover made in accordance with another form of this invention.

Referring now to the first three figures of the drawing, it will be seen that the device herein claimed comprises the following component parts: a cover 10 which is adapted to fit over the open end of a can 12, and a combination measuring and dispensing device 14 which is either secured to or integral with said cover 10. The cover is made, preferably, of sheet plastics formed under pressure and in the presence of heat but it may also be molded to appropriate shape and it may be made of other materials as well. In one preferred form it has a flat disc-shaped or dome-shaped top portion 10a and a polygonal side wall or apron 10b. There may be a peripheral bead or flared flange 10c along the lower edge of said polygonal wall. Actually, the wall 10b is a cylindrical wall composed of a plurality of flat portions which combine to describe a polygon in end view. The reason for the use of a polygonal wall of this character is to render the cover adjustable to cans of various sizes. The flat portions of the wall tend to bow out under the camming action of a can being inserted into the cover. The extent of the bowing action is a factor of the size of the can, reference being here made to its outer circumference.

The housing 14a of the measuring and dispensing device may be secured to or integral with the top wall 10a of the cover. One method of making it is to mold it, together with the cover, as a single integral plastic molding. Another way is to make a separate plastic molding out of said housing and then to secure it to the cover by means of a suitable cement or solvent or by any other fastening means. Like the cover, said housing may be made of materials other than plastics.

It will be noted that housing 14a is somewhat cylindrical in shape, its longitudinal axis lying on a plane which is parallel to the plane of the top portion 10a of the cover. The axis extends transversely or laterally of the measuring and dispensing unit as a whole. It will be noted that there is an opening 14b in the bottom of the cylindrical housing and that said opening registers with a corresponding opening 10d in the top wall of the cover. It is through these two openings that communication is provided between the inside of the can and the inside of the measuring and dispensing device.

Rotatably mounted in the cylindrical housing is a sleeve or cylinder 16 which may be closed at both ends. An opening 16a is formed in said sleeve for registration with openings 14b and 10d and it is through all three openings that communication is provided between the inside of the can and the inside of sleeve 16. The inside of sleeve 16 may be considered to constitute the measuring chamber of the device. When the sleeve is in the angular position which it is shown to occupy in Fig. 3, coffee may be poured into said sleeve through the three openings aforementioned by simply tilting or inverting the coffee can and holding it in such position until the sleeve is filled. This is a matter of but an instant.

It will also be seen that a second opening 14c is formed in the front wall of housing 14a. A corresponding opening 16b is formed in sleeve 16. Openings 14b and 14c are spaced from each other and openings 16a and 16b are also spaced from each other. Sleeve 16 may be turned on its own axis until its opening 16a is out of registration with opening 14b and its opening 16b is in registration with opening 14c. When the sleeve is in this position, it is closed to communication with the inside of the can and it is open to the atmosphere. Opening 14c together with opening 16b may be considered to constitute the spout or dispensing opening of the device through which the coffee which had previously entered the measuring chamber may leave said chamber and be poured into a suitable utensil.

A finger piece 18 may be formed on or connected to one end of sleeve 16. This finger piece may be used to turn the sleeve to either of its two positions in the cylindrical housing as above described. A tension spring 20 may be secured at one end to the sleeve and at its opposite end to the housing and it may be positioned in such manner that it will tend to hold the sleeve in or return the sleeve to the position which it is shown to occupy in Fig. 1. The curved arrow in Fig. 1 shows the direction of rotation of the sleeve and the dotted lines 18a and 22 show the position which finger piece 18 occupies when it is moved by a finger against the action of the spring to the other of its two positions. When the finger piece is released by the finger, the spring returns it and the sleeve to which it is connected to the solid line position in Fig. 1. An annular groove or track 24 may be provided in sleeve 16 to accommodate spring 20 and the presence of said spring in said groove will tend to hold the sleeve in place in the housing against any tendency which it might have toward axial shifting or displacement.

Sleeve 16 and its finger piece 18 and its grooved portion which accommodates the spring may all be molded of plastics and they may all constitute a single molding. However, they may be made of other materials and in other ways.

Referring now to Figs. 4, 5, and 6 of the drawing it will be seen that a cover 30 is provided which corresponds to cover 10 above described. However, cover 30 is cylindrical in shape with a cylindrical side wall 30a in place of the polygonal side wall above described. It may have a flared apron portion 30b along its lower peripheral edge to facilitate mounting said cover on a can. Secured to the top wall 30c of the cover, or integral therewith, is a cylindrical housing 32 which corresponds to cylindrical housing 14a of the first form of this invention. The longitudinal axis of cylindrical housing 32 extends forwardly and backwardly rather than sidewardly as is the case with cylindrical housing 14a.

The back end of the cylindrical housing is completely open and it is through such end that a sleeve or drum 34 may be inserted into said housing. The opposite or forward end of the cylindrical housing 32 is also open but extending across it is a wall 33 which covers only a part of said forward end, leaving an opening 32a. Wall 33 includes an ear 33a which extends into said opening 32a. Sleeve 34 is rotatably mounted in cylindrical housing 32 on a common longitudinal axis therewith. It will be noted that a back wall 35 closes the back end of sleeve 34 and that said back wall includes a radially outwardly extending annular flange which is engageable with the back end of the cylindrical housing to prevent axial displacement of said sleeve relative to said cylindrical housing in forward direction. Projecting forwardly from said back wall 35 is a centrally extending shaft 36 whose forward end is journaled into the front wall 33 of the cylindrical housing and its ear 33a. A washer 36a and a cotter pin 36b on the forwardly projecting end of said shaft 36 prevent axial displacement thereof in rearward direction and consequently such displacement of sleeve 34 itself is prevented.

The forward end of sleeve 34 is provided with an opening 34a which is adapted to register with the corresponding opening 32a in the front end of the cylindrical housing. There is an opening 34b in the side wall of the sleeve and a corresponding opening 32b in the bottom of the cylindrical housing. By the same token there is an opening in the top wall of the cover which registers with opening 32b in the cylindrical housing. The sleeve 34 may be turned about its longitudinal axis, by means of a finger piece 38 which is secured to its back wall 35, until its side opening 34b registers with opening 32b and with the opening in the top wall of the cover. The front opening 34a of the sleeve would in such case be out of registration with the front opening 32a of the cylindrical housing and coffee may be made to enter the sleeve by tilting or inverting the can as aforesaid. Finger piece 38 may then be turned to turn the sleeve in the cylindrical housing until openings 34b and 32b are out of registration with each other and openings 34a and 32a are in registration with each other. The coffee may now be dispensed through the latter two openings by appropriate tilting of the can.

Fig. 7 is a fragmentary view of a cover 40 which corresponds to covers 10 and 30 above described. This cover 40 has a curved or cylindrical wall 40a which is provided with a plurality of notches 40b along its peripheral edge 40c. These notches lend flexibility and resilience to the side wall and render it adaptable to cans of various circumferential dimensions. Peripheral edge 40c may be considered to constitute an interrupted or notched outwardly flaring flange and its function is to facilitate applying the cover to the can and removing it from the can.

The foregoing is illustrative of preferred forms of this invention and it will clearly be understood that these preferred forms may be modified and other forms may be provided within the broad spirit of the invention and the broad scope of the claim.

We claim:

A measuring and dispensing device of the character described, comprising a cover which is adapted to fit over and frictionally engage the open top portion of a coffee can or the like, and a combination measuring and dispensing device on said cover for measuring and dispensing a predetermined quantity of the contents of said can, said cover having a top wall which is adapted to cover the open top of the can and a downwardly extending annular flange which is adapted to encircle and frictionally engage the open top portion of said can, said measuring and dispensing device comprising a cylindrical housing which is connected to the top wall of the cover, an opening being formed through said cover to the inside of said cylindrical housing to provide communication between said cylindrical housing and the inside of a can on which said cover may be mounted, said cylindrical housing being entirely open at its back end and provided with a wall at its forward end which only partly closes said forward end, leaving an opening through which the contents of the can may be dispensed, and a drum rotatably mounted in said cylindrical housing, said drum having an opening at its forward end which is registrable with the forward opening in the cylindrical housing, said drum having a back wall which closes its back end, said back wall being provided with a radially outwardly extending annular flange which is engageable with the back end of the cylindrical housing to prevent axial displacement of said drum relative to said cylindrical housing in forward direction, a central shaft being secured at its back end to said back wall of the drum and projecting forwardly therefrom axially thereof, the forward end of said shaft being journaled into said front wall of the cylindrical housing and projecting forwardly therefrom, a cotter pin being attached to said forwardly projecting end of the shaft to prevent axial displacement of said shaft and the drum in rearward direction relative to said cylindrical housing, said drum having a side opening which is registrable with the opening which is formed through the cover to the inside of the cylindrical housing to admit some of the contents of the can to enter said drum when the can is tilted to point its open top end in downward direction, said side opening in the drum and said opening in the forward end of the drum being so situated relative to each other and to the opening formed through the cover to the inside of said cylindrical housing and the opening in the forward end of said cylindrical housing, that when said side opening in the drum is in registration with the opening through the cover, the forward end opening in the drum is out of registration with the forward end opening of the cylindrical housing, and when said forward end openings of said drum and cylindrical housing are in registration with each other, said side opening in the drum is out of registration with said opening through the cover, a handle being provided on the back wall of said drum so that it may be turned about its longitudinal axis first to register the side opening in said drum with the opening through the cover in order to admit some of the contents of the can into said drum, and then to register the forward opening in said drum with the forward opening in said cylindrical housing to dispense the contents of said drum.

References Cited in the file of this patent

UNITED STATES PATENTS

| | | |
|---|---|---|
| 1,365,398 | Gregory | Jan. 12, 1921 |
| 1,879,109 | Coy | Sept. 27, 1932 |
| 1,993,021 | Slaten | Mar. 5, 1935 |
| 2,518,520 | Broun | Aug. 15, 1950 |
| 2,611,516 | Baldner | Sept. 22, 1952 |